Patented Jan. 5, 1954

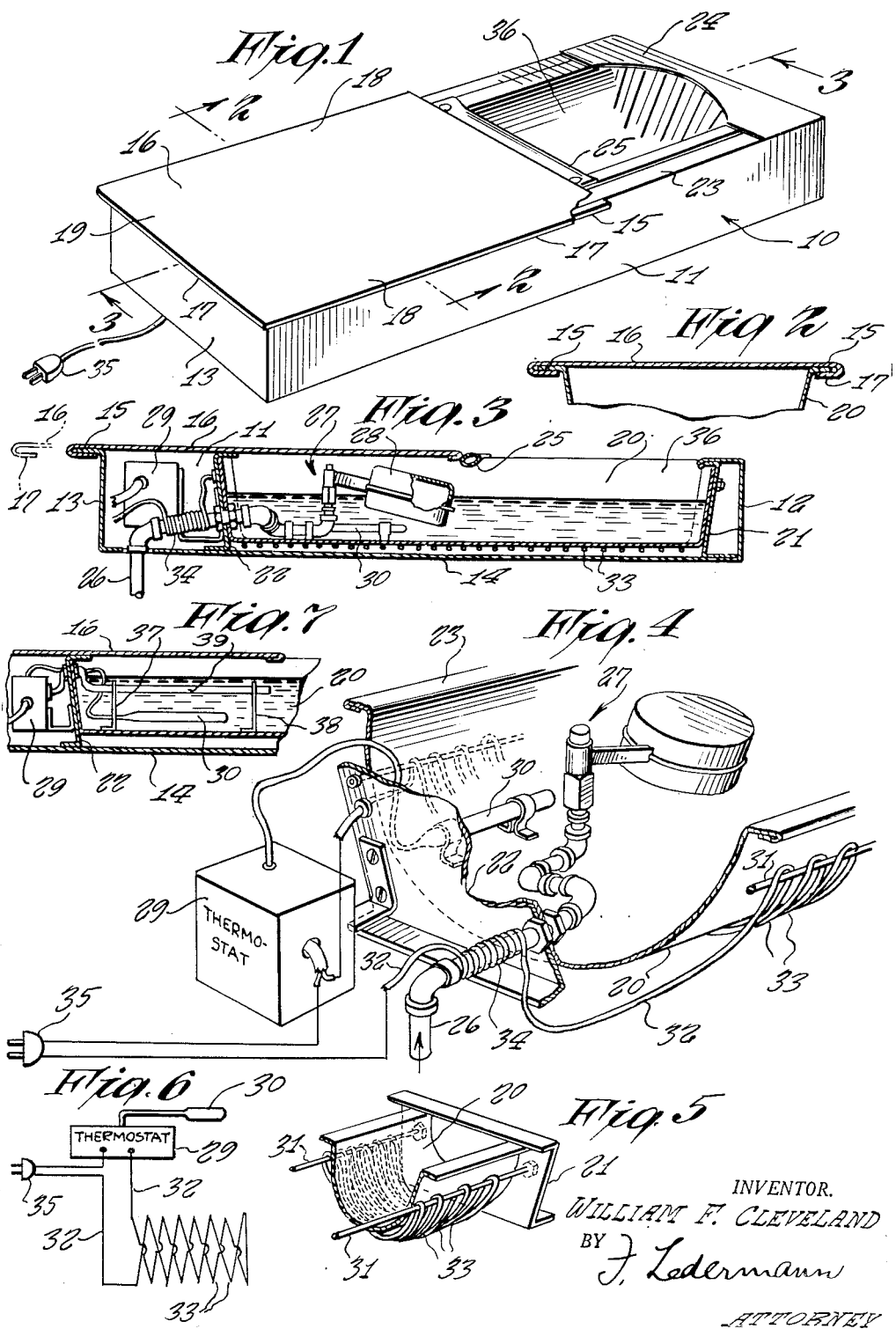

2,665,366

UNITED STATES PATENT OFFICE 2,665,366

ELECTRIC AUTOMATIC STOCK AND CHICKEN WATERER

William F. Cleveland, Rock Falls, Ill.

Application March 20, 1951, Serial No. 216,600

1 Claim. (Cl. 219—38)

This invention relates to watering apparatus for stock, chickens or other domestic animals, and the main object thereof is the provision of an efficient and practical waterer in which the water will be maintained at a constant and suitable temperature and at a constant level.

Another object of the invention is the provision of a waterer for the purpose mentioned, comprising an elongated housing box-like in general appearance and divided transversely into two compartments, one of said compartments comprising a permanently open or exposed trough at which the animals may drink, the other of said compartments containing the water feed and temperature control apparatus and being normally covered and concealed by a slide door to keep the animals away from and out of contact with the control apparatus.

The above broad as well as additional and more specific objects will be clarified in the following description wherein characters of reference refer to like-numbered parts in the accompanying drawing. It is to be noted that the drawing is intended solely for the purpose of illustration and that it is therefore neither desired nor intended to limit the invention necessarily to any or all of the exact details of construction shown or described except insofar as they may be deemed essential to the invention.

Referring briefly to the drawing, Fig. 1 is a perspective view of the stock or chicken waterer of this invention.

Fig. 2 is a sectional view taken on the line 2—2 of Fig. 1.

Fig. 3 is a sectional view taken on the line 3—3 of Fig. 1.

Fig. 4 is a fragmentary enlarged perspective view of the device, with parts broken away and partly in section, showing the water level and temperature control apparatus and including a wiring diagram, in part.

Fig. 5 is a fragmentary perspective view, with parts broken away and partly in section, of the inner or false bottom of the device and including the support of the said false bottom at one end.

Fig. 6 is a more complete wiring diagram of the device.

Fig. 7 is a fragmentary longitudinal sectional view of a modified form of the device, in which a straightened out Calrod is used to heat the water instead of the loops of heating wire illustrated in Figs. 3, 4 and 5.

Referring in detail to the drawings, the numeral 10 indicates an elongated substantially rectangular box-like housing including opposed side walls 11, end walls 12 and 13, and the bottom wall 14. A continuous horizontal eave or lip 15 extends from the tops of the end wall 13 and the adjacent side walls 11, the lip 15 on the side walls 11 extending only part way of the length of the said side walls, substantially as shown. A slide cover 16 having a continuous doubled-back-under edge bead 17 extending along its opposed side edges 18 and its front (left-hand, Fig. 1) edge, is slidably mounted over the left-hand end of the housing 10 by registration of the side wall lip portions 15 in the side edge beading 17. Thus, when the cover 16 is slid home on the lip 15 it covers approximately one-half of the open top of the housing 10.

A false bottom or trough 20 is mounted within the housing 10 and is supported therein on two transverse partitions 21 and 22, the former being positioned close to but spaced from the end wall 12 of the housing 10, and the latter being spaced from the other housing end wall 13. Horizontal sheet fillers 23 and 24 cover the otherwise open space between the tops of the trough edges and the side walls of the housing, and between tops of the partition 21 and the end wall 12; these fillers may of course be supplied in any desired form, as, for instance, the fillers 23 may be provided in the form of horizontally outwardly turned extensions of the upper edges of the trough 20, as shown in Fig. 4.

A transverse tie rod or member 25 may be provided between the opposed sides of the trough 20 at the position where the opposed sides of the lip 15 terminate, that is, at about the position where the cover 16 terminates when the cover is in place.

A water feed pipe 26 enters the housing 10 between the end wall 13 and the partition 22 and passes into the trough 20 through the latter. The pipe 26 terminates in the trough in a float-controlled constant water level valve 27 controlled by the float 28. A thermostat switch 29 is mounted in the space between the partition 22 and the wall 13, and its thermostat or temperature-sensitive element 30 is mounted within the trough 20.

On the outside of the trough 20 a pair of rods 31 are positioned, extending horizontally between the partitions 21 and 22 and spaced from the walls of the trough. A continuous length of heating wire 32 is passed around the bottom of the trough and over the opposed rods 31 to form a series of closely arranged loops 33 over the under and outer surface of the trough. The same length of wire is also passed around a substantial portion of the length of pipe which is positioned between the wall 13 and the partition 22, as shown at 34. The two ends of the wire 32 are carried into a connector plug 35 for connection with an electric socket, not shown, with, of course, the thermostat 29 inserted in series into the wire 32.

It is now readily apparent that, upon setting the thermostat at the desired temperature and with the plug 35 connected to the electric supply socket, the temperature of the water in the trough will be maintained relatively constant, and of course the level of the water will also be maintained by the float-operated valve 27, the water being heated by the heat emitted from the loops 33 around the outside of the trough as well as by the coils 34 around a portion of the pipe 26.

Since the cover 16 covers and protects from the animals the water inlet valve, the float 28, and the thermostat unit 30, in fact all of the apparatus for operation of the automatic controls, the exposed end only of the trough between the tie 25 and the partition 21, indicated by the numeral 36, is accessible to the animals. Thus it is impossible for the animals to come into contact with or disturb the control apparatus. Moreover, since only the free and clear inside of the trough, at 36, is accessible to the animals, in the event that they should have caused the trough at 36 to accumulate a lot of mud as a result of their standing in it, they may easily root out the mud without disturbing the control apparatus and without having the latter interfere with their rooting out of the mud.

In the event that the control apparatus, which is all situated under the cover 16, should require attention or repair, it is readily made accessible by sliding away the cover 16.

In the modification shown in Fig. 7, in place of the loops 33 of the wire 32, previously described, a straightened out length of Calrod 39 is used to heat the water, and it is supported in the trough under the cover 16 on uprights 37 and 38.

It is apparent from the above that an efficient waterer for domestic animals or fowl has been provided, which will function continuously without requiring any undue attention from the owner.

Obviously, modifications in form or structure may be made without departing from the spirit or scope of the invention.

I claim:

A device of the class described comprising an elongated housing having a bottom wall, opposed side walls and opposed end walls and open at the top, a trough mounted within the housing and spaced from said bottom wall, said side walls and said end walls, transverse partitions in said housing forming end walls for said trough, a water inlet pipe leading into said trough, electrical means for heating the water in said trough, a connector plug connected with said electrical means, said plug being adapted to be connected to an electric supply socket, said electrical means comprising a single length of heating wire, said device having opposed longitudinal rods supported between said partitions and positioned between the sides of the trough and the side walls of the housing close to but spaced from the outside upper edges of said trough, said wire being simultaneously trained about said rods and passed transversely around the outside surface of said trough to provide longitudinally spaced transverse loops.

WILLIAM F. CLEVELAND.

References Cited in the file of this patent

UNITED STATES PATENTS

| Number | Name | Date |
|---|---|---|
| 1,329,939 | Todd | Feb. 3, 1909 |
| 1,459,142 | Cruzen et al. | June 19, 1923 |
| 1,488,086 | Zieglowsky | Mar. 25, 1924 |
| 2,479,355 | Hemker | Aug. 16, 1949 |
| 2,511,721 | Langenbahn | June 13, 1950 |